United States Patent [19]
Mize et al.

[11] Patent Number: 5,312,860
[45] Date of Patent: May 17, 1994

[54] HEAT-CURABLE SILICONE RUBBER COMPOSITION AND CURED PRODUCT THEREOF

[75] Inventors: Kipp J. Mize, Lakewood, Calif.; Masaharu Takahashi; Yoshio Inoue, both of Annaka, Japan

[73] Assignee: Shin-Etsu Chemical Co., Ltd., Tokyo, Japan

[21] Appl. No.: 942,982

[22] Filed: Sep. 10, 1992

[51] Int. Cl.$^5$ .............................................. C08K 3/34
[52] U.S. Cl. ................................. 524/493; 524/588; 524/837; 524/847; 524/861; 524/862; 528/42
[58] Field of Search ............... 524/861, 862, 847, 837, 524/493, 588; 528/42

[56] References Cited

U.S. PATENT DOCUMENTS

| | | | |
|---|---|---|---|
| 2,934,549 | 4/1960 | Jarrant et al. | 528/42 |
| 2,961,425 | 11/1960 | Pierce et al. | 528/42 |
| 3,006,878 | 10/1961 | Talcott | 528/42 |
| 3,015,585 | 1/1962 | Holbrook et al. | 528/42 |
| 3,025,177 | 3/1962 | Peffer | 528/42 |
| 3,038,000 | 6/1962 | Schmidt | 528/42 |
| 3,050,492 | 8/1962 | Polmanteer et al. | 528/42 |
| 3,070,617 | 12/1962 | Holbrook | 528/42 |
| 3,671,480 | 6/1972 | Wada et al. | 260/29.15 B |
| 4,433,007 | 2/1984 | Marwitz et al. | 524/862 |
| 4,857,564 | 8/1989 | Maxson | 523/212 |
| 5,118,754 | 6/1992 | Miyakoshi et al. | 524/862 |

*Primary Examiner*—John C. Bleutge
*Assistant Examiner*—Karen A. Dean
*Attorney, Agent, or Firm*—Birch, Stewart, Kolasch & Birch

[57] ABSTRACT

The present invention provides a heat-curable silicone rubber composition to be cured by hydrosilation reactions and having outstanding physical properties, especially a high tear strength, said composition comprising
(A) a polydiorganosiloxane having at least two unsaturated aliphatic hydrocarbon groups and represented by the general formula (1):

$$R_a^1 SiO_{(4-a)/2} \quad (1)$$

wherein $R^1$ represents a substituted or unsubstituted monovalent hydrocarbon group containing 0.01 to 15 mole % of an unsaturated aliphatic hydrocarbon group, a is a positive number of from 1.95 to 2.05.
(B) a polyorganohydrogensiloxane having at least three hydrogen atoms directly bonded to silicon atom in a molecule,
(C) silica filler having a specific surface area of at least 50 m$^2$/g, and
(D) an addition reaction catalyst,
(E) water, and preferably
(F) an organosilane represented by the general formula:

$$R_m^2 Si(OR)_{4-m}$$

wherein $R^2$ represents a substituted or unsubstituted monovalent hydrocarbon group, R represents a hydrogen atom or a substituted or unsubstituted alkyl group having 1 to 10 carbon atoms, and m is 0, 1 or 2, or a polysiloxane having a polymerization degree of 100 or less obtained by hydrolysis thereof.

24 Claims, No Drawings

HEAT-CURABLE SILICONE RUBBER COMPOSITION AND CURED PRODUCT THEREOF

BACKGROUND OF THE INVENTION

1. Field of the Invention

This invention relates to a high consistency heat-curable silicone rubber composition and a silicone rubber obtained by curing said composition. The heat-curable silicone rubber composition is cured into a cured product having a high strength and can be used for many diverse applications, for example, tubes, gaskets, diaphragms and the like.

2. Description of the Prior Art

The prior art teaches many ideas that relate to silicone rubber compositions including those having optical clarity. These silicone rubber compositions can be used for many diverse applications requiring optical clarity, for example, tubes, hoses, diaphragms, packings, contact lenses, etc.

It is necessary to blend an extrusion compatible crosslinker into silicon rubber compositions prior to the extrusion process and the subsequent curing process. Dichlorobenzoyl peroxide is a well-known extrusion compatible crosslinker which is widely used in such silicone rubber compositions. It is an unstable peroxide in compositions and initiates a free radical reaction that forms crosslinkages between adjacent polymer chains. However, dichlorobenzoyl peroxide has a disadvantage of needing to go through a lengthly post-cure process to remove harmful decompositional by-products.

As compared with the above peroxide curing compositions, addition catalyzed compositions do not require the time consuming post-cure process, but typically do, to obtain optimum physical characteristics. The prior art teaches many ideas that relate specifically to high consistency silicone rubber compositions which are catalyzed by hydrosilation reactions and cured into silicone rubbers with optical clarity.

Addition reaction occurs between hydrosilyl groups and vinyl groups, usually catalyzed by a platinum compound such as chloroplatinic acid, forming Si—C bonds as described in the following formula.

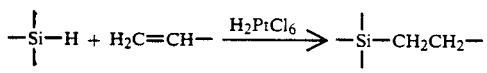

This type of crosslinking system has some advantages over other kinds of vulcanizing agents. Once the proper components are allowed to react together, the composition can be vulcanized rapidly at elevated temperatures or much more slowly at room temperature.

Among silicone rubber compositions, fluorosilicone rubber compositions such as those containing trifluoropropyl groups can be cured in the presence of a hydrogen atom-containing crosslinker as the other silicone rubber compositions can. The fluorosilicone rubber compositions have less heat and acid resistance, but have improved physical properties as compared with dimethylsilicone rubber compositions.

U.S. Pat. No. 3,671,480, issued to Wada, discloses addition crosslinked polyorganosiloxane compositions which contain two different vinyl-containing polydiorganosiloxanes to achieve notable improvements in the physical properties, especially tear strength. One of the two polymers is a gum having a polymerization degree greater than 3000 and containing from 0.02 to 0.2 mole percent of vinyl radicals. The second polymer utilized contains at least 2 mole percent of vinyl radicals with a polymerization degree of less than 100, which encompasses only liquid polydiorganosiloxanes.

U.S. Pat. No. 4,857,564, issued to Maxson, also teaches high consistency organosiloxane compositions which contain two different polydiorganosiloxanes. Maxson teaches improved tear strength and elongation are achieved by including in the composition a vinyl-containing liquid polydiorganosiloxane that is immiscible with the gum type polydiorganosiloxane composed of the major organosiloxane ingredient of the composition.

The prior art teach different ways with which one can improve the physical properties of addition catalyzed polydiorganosiloxane vulcanizates. The patents issued to Wada and Maxson, for example, utilize a blend of two different polydiorganosiloxanes to achieve desired results. The compositions catalyzed by hydrosilation reactions can display outstanding tear strengths when two different vinyl-containing polydiorganosiloxanes are blended together. A majority of the composition contains a lower vinyl-containing organosiloxane, and a higher vinyl-containing organosiloxane is added thereto in a smaller quantity to create an uneven vinyl distribution. This facilitates localized crosslinking networks which help to improve tear strengths of the material.

SUMMARY OF THE INVENTION

An object of the present invention is to provide a high consistency silicone rubber composition which can be cured into a silicone rubber having a superior tear strength through a different methods from any other prior art silicone rubber compositions.

We have found that when water is added to a compound containing a polydiorganosiloxane represented by the following formula:

$$R_a^1 SiO_{(4-a)/2} \qquad (1)$$

wherein $R^1$ represents an unsubstituted or substituted monovalent hydrocarbon group provided that 0.01 to 15 mole % of $R^1$ is an unsaturated aliphatic hydrocarbon group, and a is a positive number of 1.95 to 2.05, and finely divided silica and then a polyorganohydrogensiloxane having at least three hydrogen atoms directly bonded to silicon atoms in a molecule is blended thereto with an addition reaction catalyst, a high consistency heat-curable silicone rubber composition can be obtained. It has been discovered that water promotes agglomeration of silica particles which defines a tear-direction and helps to increase the tear strength.

We have also found that when an organosilane represented by the following formula:

$$R_m^2 SiO(OR)_{4-m} \qquad (2)$$

wherein $R^2$ represents an unsubstituted or substituted monovalent hydrocarbon group, R represents a hydrogen atom or an unsubstituted or substituted alkyl group having 1 to 10 carbon atoms, and m is 0, 1 or 2, or a polyorganosiloxane having a polymerization degree of 100 or less resulting from hydrolyzing the organosiloxane in addition to water is added to the compound containing the polydiorganosiloxane of formula (1), and the finely divided silica and then the polyorganohydrogensiloxane and the addition reaction catalyst are blended thereto, the physical properties of the cured product are remarkably improved.

Therefore, the present invention provides a silicone rubber composition comprising (A) a polydiorganosiloxane having at least two unsaturated aliphatic hydrocarbon groups and represented by the general formula (1):

$$R_a^1 SiO_{(4-a)/2} \quad (1)$$

wherein $R^1$ represents a substituted or unsubstituted monovalent hydrocarbon group containing 0.01 to 15 mole % of an unsaturated aliphatic hydrocarbon group, a is a positive number of from 1.95 to 2.05.

(B) a polyorganohydrogensiloxane having at least three hydrogen atoms directly bonded to silicon atoms in a molecule, (C) silica filler having a specific surface area of at least 50 m²/g, and (D) an addition reaction catalyst, (E) water, and preferably (F) an organosilane represented by the general formula:

$$R_m^2 Si(OR)_{4-m}$$

wherein $R^2$ represents a substituted or unsubstituted monovalent hydrocarbon group, R represents a hydrogen atom or a substituted or unsubstituted alkyl group having 1 to 10 carbon atoms, and m is 0, 1 or 2, or a polysiloxane having a polymerization degree of 100 or less obtained by hydrolysis thereof.

Preferably, component (D) is blended to a mixture of components (A), (B), (C), (E) and (F) which are previously mixed and then heat treated.

According to the present invention, there is obtained a high consistency silicone rubber composition which can be cured into a silicone rubber having a high tear strength.

DETAILED DESCRIPTION OF THE INVENTION

The present heat-curable silicone rubber composition comprises (A) a polydiorganosiloxane having at least two unsaturated aliphatic hydrocarbon groups, (B) a polyorganohydrogensiloxane having at least three hydrogen atoms directly bonded to silicon atoms (at least three ≡Si—H bonds) in a molecule, (C) a silica filler having a specific surface area of at least 50 m²/g, and (D) an addition reaction catalyst.

The polydiorganosiloxane of component (A) has at least two unsaturated aliphatic hydrocarbon groups and is represented by the general formula (1).

$$R_a^1 SiO_{(4-a)/2} \quad (1)$$

In the formula, $R^1$ is a substituted or unsubstituted monovalent hydrocarbon group comprising 0.01 to 15 mole %, preferably 0.02 to 10 mole % of an unsaturated aliphatic hydrocarbon group. When the content of the unsaturated aliphatic hydrocarbon groups is less than 0.01 mole %, the cured product does not have the desired tear strength.

The unsaturated aliphatic hydrocarbon group should preferably have 2 to 8 carbon atoms including vinyl and allyl groups. The substituted of unsubstituted monovalent hydrocarbon groups other than the unsaturated aliphatic hydrocarbon group should preferably have 1 to 10 carbon atoms, preferably 1 to 8 carbon atoms inlcuding an alkyl group such as methyl and ethyl, a halogenized alkyl group such as trifluoropropyl groups, an aryl group such as phenyl group, a halogenized aryl group and an aralkyl group such as benzyl group. The present substituted or unsubstituted monovalent hydrocarbon group should preferably contain from 5 to 55 mole %, more preferably from 10 to 55 mole % of a fluoroalkyl group. Preferred example of component (A) includes a trifluoropropylmethylpolysiloxane containing 0.01 to 15 mole % of vinyl or allyl groups.

In the above formula (1), a is a positive number of from 1.95 to 2.05. If a is less than 1.95, an unstable linear polymer is obtained which is easy to gelatinize. On the other hand, if a is over 2.05, there is obtained a polymer with too high a molecular weight.

The polydiorganosiloxane of component (A) can be prepared by the prior art technique in the presence of an alkali catalyst.

The polyorganohydrogensiloxane should have at least three hydrogen atoms directly bonded to silicon atoms in a molecule and is an effective multiple functional crosslinker to a silicone rubber composition catalyzed by hydrosilylation reaction.

Any conventional polyorganohydrogensiloxanes can be used as component (B); i.e., polyorganohydrogensiloxanes having a fluorinated alkylene group or a fluoronated polyether group including one represented by the following general formula (3).

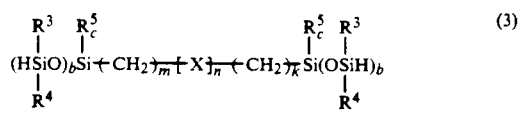
$$(HSiO)_b Si(-CH_2\frac{}{m}-X\frac{}{n}-CH_2\frac{}{k})Si(OSiH)_b \quad (3)$$
with $R^3$, $R^5$ above and $R^4$ below on each Si.

In formula (3), $R^3$, $R^4$ and $R^5$ independently represent the same or different substituted or unsubstituted monovalent hydrocarbon group having preferably 1 to 10 carbon atoms, more preferably 1 to 8 carbon atoms. Examples of the substituted or unsubstituted monovalent hydrocarbon groups include those exemplified as in $R^1$, X is $CF_2$ or $C_3F_6O$, b is equal to 2 or 3, c is equal to 0 or 1 and b+c=3, m is a positive number of 2 or more, n is a positive number of 1 or more and k is a positive number of 2 or more.

If the crosslinker is too small in quantity, insufficient cross-linking will occur. If the quantity is too large, the tear strength and other physical properties will be reduced. The polyorganohydrogensiloxane of component (B) should preferably be added in such an amount that a ratio of the mole percent of HSi groups contained therein to the total mole percent of unsaturated aliphatic hydrocarbon groups contained in polyorganosiloxane (A) is in the range of 0.5 to 5. The polyorganohydrogensiloxane component (B) should preferably be blended in an amount of from 0.05 to 10 parts by weight, preferably, 0.5 to 5 parts by weight per 100 parts by weight of component (A).

Ordinary silica fillers used for prior art silicone rubber compositions can be employed as component (C), and can be exemplified by finely divided powders of silica such as fumed silica, calcined silica, precipitated silica and the like. The specific surface area (BET) of the silica filler should have at least 50 m²/g, preferably 50 to 400 m²/g, as measured by the nitrogen absorption method, to improve mechanical strength, and the particle size thereof is preferably from 5 μm to 10 μm, more preferably 5 μm to 1 μm. The silica filler particles, including both primary silica particles and aggregates of such primary particles, must be of such a size and shape that when properly incorporated into the polydiorganosiloxane or blend of polydiorganosiloxanes they do not appreciably scatter light and alter the optical clarity of the material. In addition, the amount of filler added also contributes to the amount of haze present in the material, therefore, formulation alterations and batch to batch variations can have an impact on the translucent characteristics of the compounded material. The quantity of silica to be incorporated into the composition should preferably be from 1 to 100 parts by weight, more preferably 10 to 70 parts by weight per 100 parts by weight of component (A).

The addition reaction catalyst added to the composition as component (D) is preferably a soluble platinum compound such as chloroplatinic acid, or a complex of platinum chloride and an olefine such as ethylene, propylene, butadien and cyclohexane. The quantity of compound (D) required can be from 0.1 to 1,000 ppm, preferably 1 to 200 ppm as metal platinum based on the weight of the composition.

In the present composition, water is blended as component (E). Water of component (E) may be deionized water, and should preferably have a pH of 5 to 8, otherwise heat resistance and physical properties of the silicone rubber composition will be reduced.

From 0.1 to 10 parts, preferably from 1 to 5 parts by weight of water is desirably added to 100 parts by weight of component (A). If the water content is smaller than 0.1 parts by weight, the desired properties are not obtained. On the other hand, if the water content is over 10 parts by weight, its physical properties may be reduced because silica particles may agglomerate too much.

Water used as component (E) can be added separately or together with component (A) or (C) or in combination with components (A) and (C) of the present invention during any step of the mixing process before components (B) and (D) are mixed. This may also include silica particles which are precipitated before the compounding process.

More specifically, water is mixed thoroughly with the polydiorganosiloxane of component (A) and the silica filler of component (C) and thereafter the polyorganohydrogensiloxane of component (B) and the addition reaction catalyst of component (D) and retardant(s) are blended.

In the present composition, it is preferred to blend as component (F) an organosilane represented by the following formula (2) or a polyorganosiloxane having a polymerization degree of 100 or less obtained by hydrolyzation of the organosilane

$$R_m{}^2Si(OR)_{4-m} \quad (2)$$

wherein $R^2$ is a substituted or unsubstituted monovalent hydrocarbon group, R is a hydrogen atom or a substituted or unsubstituted alkyl group having 1 to 10, preferably 1 to 8 carbon atoms. In the formula, a halogenized alkyl group such as a fluoroalkyl group can be exemplified as the substituted alkyl group and m is equal to 0, 1 or 2. There is nothing critical about the structures of the organosilane and polyorganosiloxane. As the organosilane, $CH_3Si(OCH_3)_3$, $CH_3Si(OC_2H_5)_3$, $(CH_3)_2Si(OCH_3)_2$, $(CH_3)_3SiOH$, $CF_3C_2H_4Si(OCH_3)_3$, $CF_3C_2H_4Si(OC_2H_5)_2$, $C_8H_{17}Si(OCH_3)_3$ and $C_3F_7O(C_3F_6O)_3C_3H_6Si(OCH_3)_3$ can be exemplified. Among them, $CF_3C_2H_4Si(OCH_3)_3$ is the preferred component.

From 1 to 20 parts, preferably from 1 to 10 parts by weight of component (F) is added to 100 parts by weight of component (A). If the content of component (F) is smaller than 1 part by weight and larger than 20 parts by weight, cured products having a desired outstanding properties are not obtained.

The organosilane or polyorganosiloxane of component (F) is also blended with water with the polydiorganosiloxane of component (A) and the silica filler of component (C) and thereafter the polyorganohydrogensiloxane of component (B) and the addition reaction catalyst of component (D) are blended.

The heat curable silicone rubber compositions of this invention are prepared by kneading mixtures of the above components by means of a mixing device, together with a processing aid or surface treatment additive. Suitable treating agents are well known in the art and include, but are not limited to, hydroxyl terminated short chain polydiorganosiloxane fluids and hexaorganodisilazanes. Other various components may also be added to improve specific physical properties of the material such as heat stabilizers and pigments. In order to further improve the storage stability of the product, acetylene alcohols, organic phosphorous compounds or organic amines and other retardants known to the art may be added as well.

The ingredients including water and the organosilane or siloxane should preferably be mixed under a low shear stress and a low shear rate using a dough mixer, Banbury mixer or other mixing device in order to add water and obtain an uniform composition.

The ingredients of the present invention can be blended together anywhere from about 15 minutes to roughly 5 hours, depending upon the amount of material being processed, the viscosity of the material, and the shear rate to which the material is subjected during processing. Irrespective of the type of mixer used, blending of the polydiorganosiloxane(s), silica, and silica treating agent including a process aid and a dispersion is continued while the composition is heated at temperatures from about 100° to 250° C. Curable compositions of this invention are prepared by blending the resultant mixture with the organohydrogensiloxane of component (B) and the hydrosilation catalyst of component (D).

If desired, the silica filler can be treated in the presence of the polydiorganosiloxane or alternately, treatment of the silica can occur before the silica is blended with the other ingredients of the present invention.

Since the silicon rubber composition according to the present invention contains an addition reaction catalyst such as a platinum-containing catalyst and may begin to cure under ambient conditions, it is desirable to package the components separately to achieve long-term storage stability.

A cured product results from curing the silicone rubber composition preferably at a temperature of from 50° to 300° C. for 1 to 30 minutes, and then post-curing the composition at a temperature of 100° to 250° C. for 0 to 8 hours.

The following examples are intended to describe preferred embodiments of the present invention and should not be interpreted as limiting the scope of the invention as defined in the accompanying claims. Unless otherwise specified, all parts and percentages specified in the examples are by weight.

EXAMPLES 1 TO 4 AND COMPARATIVE EXAMPLE 1

Silicone rubber compositions were prepared by uniformly mixing the following ingredients (1) to (4) by a kneader mixer at 150° C. for 2 hours, then adding and mixing ingredients (6) and (7) by a two-roll mill and finally mixing ingredient (5).

The composition was press molded into a sheet shape being 2 mm thick at a temperature of 165° C. for 10 minutes under a pressure of 100 kg/cm² and then post-cured for 4 hours in an oven heated at a temperature of 200° C. The physical properties of the cured sample were measured according to ASTM-D624 die B. The results are shown in Table 1.

(1) 100 parts of polyorganosiloxane containing 99.7 mole percent trifluoropropylmethylsiloxane units and 0.3 mole percent methylvinylsiloxane units,
(2) 45 parts of fumed silica having a specific surface area of 300 m²/g,
(3) 10 parts of a short chain hydroxylterminated polydimethylsiloxane
(4) 0 to 4 parts of water having a pH of 7,
(5) 0.91 parts of polyorganohydrogensiloxane (cross-linker) shown below:

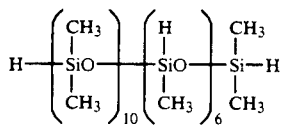

(6) 0.1 parts of chloroplatinic acid-containing 2-ethyl-hexylalcohol solution (Pt content: 2%), and
(7) 0.1 parts of ethynylcyclohexanol (retardant).

TABLE 1

| | Comparative Example | Example 1 | Example 2 | Example 3 | Example 4 |
|---|---|---|---|---|---|
| H₂O (parts/100 parts[(1)]) | 0.0 | 1.0 | 2.0 | 3.0 | 4.0 |
| Hardness (Shore A) | 58 | 57 | 53 | 54 | 52 |
| Tensile strength (kgf/cm²) | 125 | 126 | 126 | 127 | 139 |
| Elongation (%) | 517 | 543 | 565 | 581 | 541 |
| Tear strength (kgf/cm) | 36 | 41 | 48 | 52 | 55 |

As is apparent from the results shown in Table 1, the addition of moisture imparts a high tear strength to the cured product.

Tear test pieces cut from the cured material are gripped and stretched to break in a machine of the same type as used for tensile tests. In a tear test, the force is not applied evenly but concentrated on a deliberate flaw or sharp discontinuity and the force to continuously produce a new surface is measured. In most standard tests the maximum force measured during the test is recorded. This force to start or maintain tearing will depend in rather a complex manner on the geometry of the test piece and on the nature of the discontinuity. Hence, it is expected that different tear methods using different geometry will yield various tear strengths. The discontinuity at which the stress concentration is produced is formed either by a cut, a sharp re-entry angle or both. All tear strength data shown in this invention utilizes an A.S.T.M. D624 die B crescent test piece which uses a special jig to hold the test piece and move a blade across its edge. This device keeps nick depth controlled within close limits to obtain consistent results.

EXAMPLE 5

A silicone rubber composition was prepared by uniformly mixing the following ingredients of (1) to (5) by a kneader mixer at 150° C. for 2 hours, then adding and mixing ingredients (7) and (8) by a two-roll mill and finally mixing ingredient (6).

The composition was press molded into a sheet shape being 2 mm thick at a temperature of 165° C. for 10 minutes under a pressure of 100 kg/cm² and then post-cured for 4 hours in an oven heated at a temperature of 200° C. The physical properties of the cured sample was measured according to ASTM-D624 die B. The results are shown in Table 2.

(1) 100 parts of polyorganosiloxane containing 99.7 mole percent trifluoropropylmethylsiloxane units and 0.3 mole percent methylvinylsiloxane units,
(2) 45 parts of fumed silica having a specific surface area of 300 m²/g,
(3) 10 parts of a short chain hydroxylterminated polydimethylsiloxane shown below:

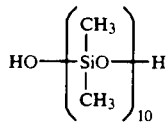

(4) 5 parts of water having a pH of 7,
(5) 1.5 parts of trifluoropropyltrimethoxysilane,
(6) 0.43 parts of polyorganohydrogensiloxane (cross-linker) shown below:

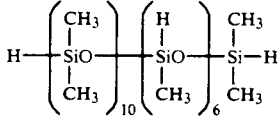

(7) 0.5 parts of chloroplatinic acid containing 2-ethyl-hexylalcohol solution (Pt content: 2%),
(8) 0.1 parts of ethynylcyclohexanol (retardant).

EXAMPLE 6

A silicone rubber composition was prepared by the same manner as in Example 5 except that C₃F₇O(C₃F₆O)₃C₃H₆Si(OCH₃)₃ was used instead of trifluoropropyltrimethoxysilane.

The outstanding properties of the resulting cured product are shown in Table 2.

COMPARATIVE EXAMPLE 2

A silicone rubber composition was prepared by the same manner as in Example 5 except that water and trifluoropropyltrimethoxysilane were not added. The outstanding properties of the thus obtained cured product was measured. The results are shown in Table 2.

EXAMPLE 7

A silicone rubber composition was prepared from the following ingredients (1) to (8) by the same manner as in Example 5. The outstanding properties of the obtained cured product were measured by the same manner as in Example 5. The results are shown in Table 2.

(1) 100 parts of polyorganosiloxane containing 99.7 mole percent trifluoropropylmethylsiloxane units and 0.3 mole percent methylvinylsiloxane units,
(2) 45 parts of fumed silica having a specific surface area of 300 m²/g,
(3) 10 parts of a short chain hydroxylterminated polydimethylsiloxane
(4) 5 parts of water having a pH of 7.2,
(5) 1 part of methyltrimethoxysilane,
(6) 1 part of a polyorganohydrogensiloxane (crosslinker)
(7) 0.1 parts of a chloroplatinic acid-containing 2-ethylhexylalcohol solution (Pt content: 2%),
(8) 0.1 parts of ethynylcyclohexanol (retardant).

TABLE 2

| | Example 5 | Example 6 | Example 7 | Comparative Example 2 |
|---|---|---|---|---|
| Hardness (Shore A) | 50 | 48 | 55 | 53 |
| Tensile strength (kgf/cm²) | 140 | 130 | 114 | 107 |
| Elongation (%) | 610 | 600 | 580 | 430 |
| Tear strength (kgf/cm) | 74 | 70 | 53 | 36 |

As is apparent from the results shown in Table 2, the test samples of Examples 5 to 7 have excellent outstanding properties, especially, high tear strength as compared the sample of Comparative Example 2.

We claim:

1. A heat-curable silicone rubber composition comprising:
   (A) 100 parts by weight of a polydiorganosiloxane having at least two unsaturated aliphatic hydrocarbon groups and represented by the general formula (1):

$$R^1_a SiO_{(4-a)/2} \quad (1)$$

wherein $R^1$ represents a substituted or unsubstituted monovalent hydrocarbon group containing 0.01 to 15 mole % of an unsaturated aliphatic hydrocarbon group, a is a positive number of from 1.95 to 2.05,
   (B) 0.05 to 10 parts by weight of a polyorganohydrogensiloxane having at least three hydrogen atoms directly bonded to silicon atoms in a molecule,
   (C) 1 to 100 parts by weight of silica filler having a specific surface area of at least 50 m²/g,
   (D) a catalytic amount of an addition reaction catalyst, and
   (E) 0.1 to 10 parts by weight of water.

2. The composition of claim 1 which is obtained by mixing components (A), (C) and (E) and thereafter mixing components (B) and (D) separately thereto.

3. The composition of claim 1 which further comprises (F) an organosilane represented by the general formula:

$$R^2_m Si(OR)_{4-m}$$

wherein $R^2$ represents a substituted or unsubstituted monovalent hydrocarbon, R represents a hydrogen atom or a substituted or unsubstituted alkyl group having 1 to 10 carbon atoms, and m is 0, 1 or 2, or a polysiloxane having a polymerization degree of 100 or less obtained by hydrolysis of said organosilane (F).

4. The composition of claim 3 which is obtained by mixing components (A), (C), (E) and (F) and thereafter mixing components (B) and (D) separately thereto.

5. The composition of claim 3 which is obtained by first mixing components (A), (B), (C), (E) and (F), then blending in component (D) and heat treating the resulting mixture.

6. The composition of claim 1 wherein the remaining substituted or unsubstituted monovalent hydrocarbon groups represented by $R^1$ contain 1 to 10 carbon atoms.

7. The composition of claim 6 wherein the remaining substituted or unsubstituted monovalent hydrocarbon groups represented by $R^1$ are selected from the group consisting of alkyl groups, halogenized alkyl groups, aryl groups, halogenized aryl groups and aralkyl groups.

8. The composition of claim 6 wherein said remaining substituted or unsubstituted monovalent hydrocarbon groups represented by $R^1$ contain 5 to 55 mole % of a fluoroalkyl group.

9. The composition of claim 1 wherein component (A) is a trifluoropropylmethylpolysiloxane containing from 0.01 to 15 mole % of unsaturated aliphatic hydrocarbon groups selected from the group consisting of vinyl groups, allyl groups and mixtures thereof.

10. The composition of claim 1 wherein said component (B) is represented by the formula

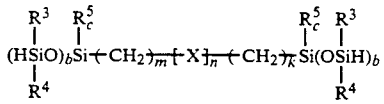

wherein $R^3$, $R^4$ and $R^5$ independently represent the same or different substituted or unsubstituted monovalent hydrocarbon groups having from 1 to 10 carbon atoms, X is $CF_2$ or $C_3F_6O$, b is 2 or 3, c is equal to 0 or 1 and b+c=3, m is a positive number of 2 or more, n is a positive number of 1 or more and k is a positive number of 2 or more.

11. The composition of claim 10 wherein $R^3$, $R^4$ and $R^5$ are selected from the group consisting of alkyl groups, halogenized alkyl groups, aryl groups, halogenized aryl groups and aralkyl groups.

12. The composition of claim 1 wherein said reaction catalyst, component (D), is a soluble platinum compound selected from the group consisting of chloroplatinic acid and complexes of platinum chloride with olefins.

13. The composition of claim 1 wherein said water component, (E), is deionized water having a pH from 5 to 8.

14. The composition of claim 3 wherein said substituted monovalent hydrocarbon group, $R^2$, is a halogenized alkyl group.

15. The composition of claim 3 wherein said component (F) is selected from the group consisting of $CH_3Si(OCH_3)_3$, $CH_3Si(OC_2H_5)_3$, $(CH_3)_2Si(OCH_3)_2$, $(CH_3)_3SiOH$, $CF_3C_2H_4Si(OCH_3)_3$, $CF_3C_2H_4Si(OC_2H_5)_2$, $C_8H_{17}Si(OCH_3)_3$ and $C_3F_7O(C_3F_6O)_3C_3H_6Si(OCH_3)_3$.

16. The composition of claim 15 wherein said component (F) is $CF_3C_2H_4Si(OCH_3)_3$.

17. The composition of claim 3 wherein the remaining substituted or unsubstituted monovalent hydrocarbon groups represented by $R^1$ contain 1 to 10 carbon atoms.

18. The composition of claim 17 wherein the remaining substituted or unsubstituted monovalent hydrocarbon groups represented by $R^1$ are selected from the group consisting of alkyl groups, halogenized alkyl groups, aryl groups, halogenized aryl groups and aralkyl groups.

19. The composition of claim 17 wherein said remaining substituted or unsubstituted monovalent hydrocarbon groups represented by $R^1$ contain 5 to 55 mole % of a fluoroalkyl group.

20. The composition of claim 3 wherein component (A) is a trifluoropropylmethylpolysiloxane containing from 0.01 to 15 mole % of unsaturated aliphatic hydrocarbon groups selected from the group consisting of vinyl groups, allyl groups and mixtures thereof.

21. The composition of claim 3 wherein said component (B) is represented by the formula

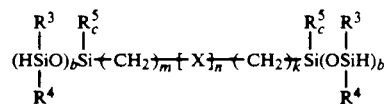

wherein $R^3$, $R^4$ and $R^5$ independently represent the same or different substituted or unsubstituted monovalent hydrocarbon groups having from 1 to 10 carbon atoms, X is $CF_2$ or $C_3F_6O$, b is 2 or 3, c is equal to 0 or 1 and b+c=3, m is a positive number of 2 or more, n is a positive number of 1 or more and k is a positive number of 2 or more.

22. The composition of claim 21 wherein $R^3$, $R^4$ and $R^5$ are selected from the group consisting of alkyl groups, halogenized alkyl groups, aryl groups, halogenized aryl groups and aralkyl groups.

23. The composition of claim 3 wherein said reaction catalyst, component (D), is a soluble platinum compound selected from the group consisting of chloroplatinic acid and complexes of platinum chloride with olefins.

24. The composition of claim 3 wherein said water component, (E), is deionized water having a pH from 5 to 8.

* * * * *